Nov. 11, 1930.    R. T. ANDERSON    1,780,961
PRESS
Filed May 28, 1928
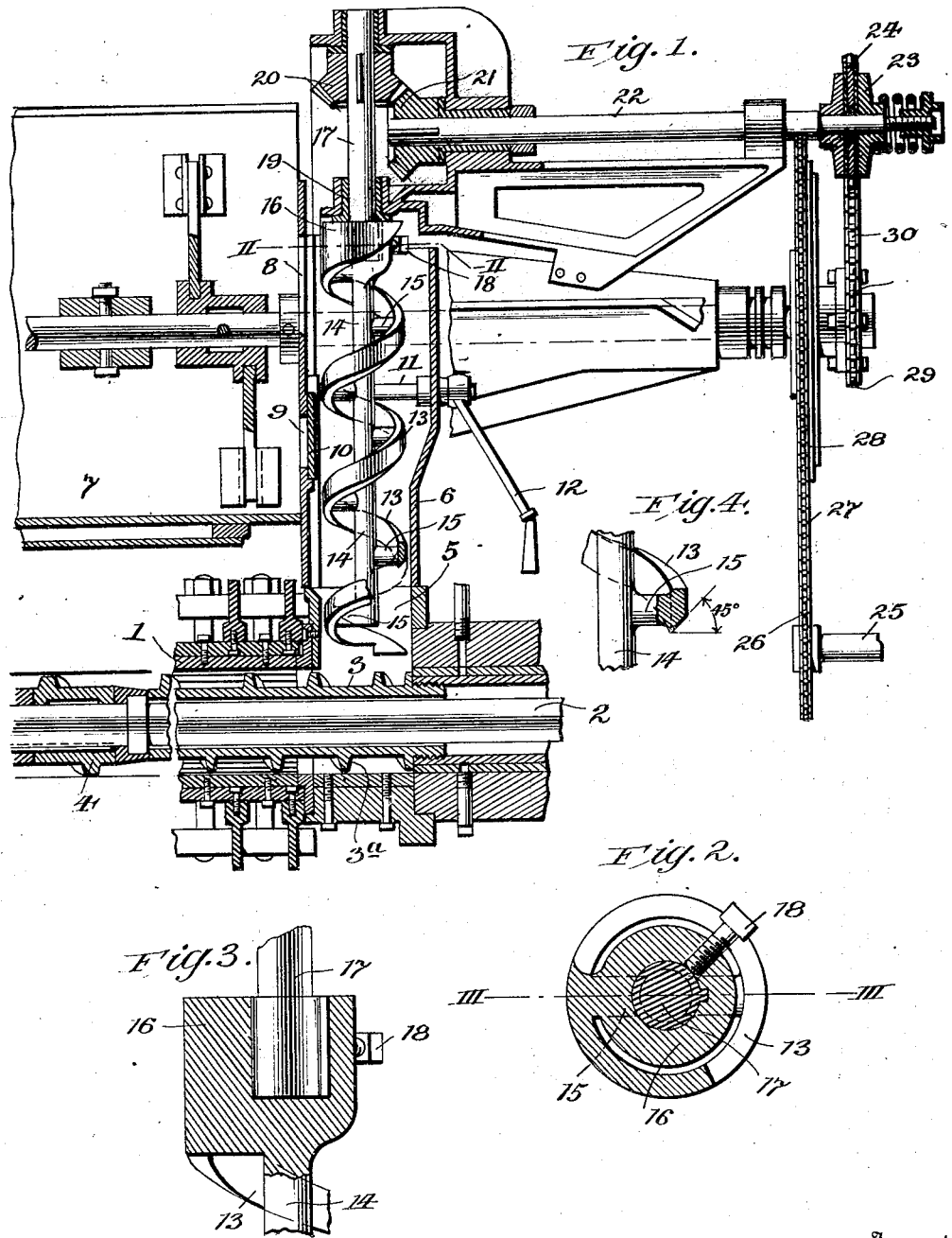
Inventor:
Raymond T. Anderson,
By Dodge and Sons,
Attorneys Patented Nov. 11, 1930

1,780,961

UNITED STATES PATENT OFFICE

RAYMOND T. ANDERSON, OF CLEVELAND, OHIO, ASSIGNOR TO THE V. D. ANDERSON COMPANY, OF CLEVELAND, OHIO, A CORPORATION OF OHIO

PRESS

Application filed May 28, 1928. Serial No. 281,214.

This invention pertains to improvements in presses and more particularly to that type wherein the material is subjected to the action of a plurality of worms or screws mounted within a fixed shell.

The object of the present invention is to provide special feeding means for the material as it enters the press.

In the treatment of certain materials, such, for instance, as cotton seed or packing house products, which latter contain tough membranes or elements, the feeding thereof becomes a troublesome factor. Ordinary spiral feeding devices cooperating with a hopper or chute to feed the material to the intake end of the screws or worms of the press frequently force too much material onto the feed worm and such spiral continues to pack the same faster than the feed worm can carry it off. Often this packed material builds up in the hopper causing the flexible spiral feeder to collapse and the lower end thereof to move away six inches or more from the feed worm. Under such conditions it becomes necessary to stop the press and chisel out the compacted mass before any other material can be fed into the press.

The present structure while employing a spiral feeder provides a special form of such feeder as will do away with this compacting of the material and allow the press to continue its operation without the necessity of shutting it down for the purpose above specified. In other words I propose to employ an open rigid spiral member or what may be termed a ribbon conveyor in the chute or hopper. By reason of the rigidity of the spiral just mentioned, the end thereof never changes its relation with reference to the feeding worm in the hopper but maintains a positive pushing action on the material close to the feeding worm.

The structure is illustrated in the annexed drawings wherein,

Figure 1 is a vertical sectional elevation of so much of a press, a tempering apparatus, and the spiral feeder forming the basis of the present invention as is necessary to an understanding of the same, Figure 2 a transverse horizontal section taken on the line II—II of Figure 1, Figure 3 a vertical sectional elevation taken on the line III—III of Figure 2, and Figure 4 a detailed sectional elevation of a portion of the spiral feeder.

The press proper may be of any approved type but preferably will embody the principle of the press such as is shown in Letters Patent to Anderson No. 731,737, dated June 23, 1903, wherein there is provided a shell or casing denoted generally by 1 and through which extends a shaft 2 and a quill 3, the latter being provided with an intake feed worm $3^a$. Said quill, as well as the shaft, will be rotated by any suitable means, not shown, the shaft, as will be seen, carrying one or more worms 4 which, acting in conjunction with the shell 1 compact the material and press the liquids such as oil, grease, water, etc., therefrom.

Extending upwardly from the intake end of the press is a hopper 5 from which extends a spout 6, said spout being in communication with a tempering trough 7 through openings or passages 8 and 9. The latter is controlled by a gate 10 which may be manipulated through an interconnected shaft 11 and a hand lever 12.

Mounted for rotation in the vertically extending spout is a spiral feeding device, which, as above noted, comprises a ribbon spiral element 13, the convolutions of which stand in separated relation, said spiral being supported by a centrally disposed shaft 14 and a series of laterally extending lugs or arms 15. The shaft preferably stops short of the lower end of the spiral. In other words the spiral flight is extended downwardly as indicated in Figure 1 to a point below the lowermost connecting lug 15 which extends outwardly from the lower end of the shaft.

As will be best seen upon reference to Figures 1 and 4, the lower face or pushing edge of the ribbon or spiral is preferably formed at an angle of forty-five degrees. This reduces the pushing action of the spiral to such an extent as to preclude the necessity of shutting down the press when acting upon certain materials. Were the lower edge of the spiral perfectly straight across there would be a tendency to clog when acting upon certain materials. The bevel, however, cuts down the effective pushing action and obviates this trouble.

The bevel may extend upwardly toward the inner or outer side of the spiral.

At its upper end the spiral is provided with a head-piece 16 having a socket formed in its upper end for the reception of the lower ends of a shaft 17, which latter is splined and fits a recess in the socket. A set screw 18 is also provided to maintain the parts against longitudinal separation thus preventing the spiral from dropping downwardly against the worm.

Shaft 17 passes through a bearing 19 and adjacent its upper end has secured to it a beveled gear 20, which latter meshes with a similar gear 21. Gear 21 is carried by a shaft 22 which also has secured upon it a frictional driving element 23 which cooperates with a sprocket wheel 24 driven from some operative portion of the press, or its driving mechanism, through shaft 25, sprocket 26, sprocket chain 27, sprocket 28, sprocket 29, and sprocket chain 30.

This frictional driving element 23 allows the feeding spiral to come to rest if for any reason it becomes clogged by a material such as a piece of iron, steel or other unyielding substance, or if the material is coming into the feeding worm 3ª faster than it can handle it.

In operation, with the rigid ribbon conveyor, as above described, choking of the press is precluded. The lower end of the spiral, of course, stands away from the outer edge of the feed worm and when too much material is fed into the press the excess or surplus passes upwardly through the center of the spiral. The spiral, however, at the same time is seeking to force the material into the feed worm located immediately below the hopper.

The present structure produces in effect a continuous feeding operation, this apparently due to the rigidity of the spiral.

What is claimed is:

1. In combination with a press for expressing liquids from materials, a hopper opening into the intake end of the same; a chute extending upwardly from the hopper; and a feed element mounted in the chute, said element comprising a rigid open spiral which stands in spaced relation to the inner face of the hopper and chute.

2. In combination with a press provided with means for expressing liquid from material fed thereto, a hopper; a chute extending upwardly from the hopper; and means for feeding the material downwardly through the chute and into the hopper, said means comprising a rigid spiral member the convolutions whereof are seperated and stand in spaced relation to the inner face of the hopper and chute, a driven shaft extending downwardly through the spiral and connecting members extending outwardly from the shaft to the spiral.

3. In combination with a press provided with means for expressing liquids from material fed thereto, a hopper; a chute extending upwardly therefrom; a rigid ribbon-like spiral located within the chute and standing in spaced relation with the inner wall thereof; and means embodying a yielding driving connection for imparting rotary motion to the spiral.

4. In combination with a press for expressing liquids from materials, a hopper opening into the intake end thereof; a chute extending upwardly from the hopper; and a feed element mounted in the chute, said element comprising a rigid open spiral, the lower or advancing face of which is formed upon an angle extending upwardly with reference to the longitudinal axis of the hopper.

5. In combination with a press for expressing liquids from materials, a hopper opening into the intake end of the same; a chute extending upwardly from the hopper; and a feed element mounted in the chute, said element comprising a rigid open spiral, the lower or advancing face whereof is upwardly inclined at an angle of substantially forty-five degrees to the longitudinal axis of the hopper.

In testimony whereof I have signed my name to this specification.

RAYMOND T. ANDERSON.